UNITED STATES PATENT OFFICE.

WILLIAM HANSON BOORNE, OF LONDON, ENGLAND.

ELECTRODE FOR ELECTRIC-ARC WELDING AND METAL-CUTTING PURPOSES.

1,415,774.     Specification of Letters Patent.     Patented May 9, 1922.

No Drawing.     Application filed March 28, 1921. Serial No. 456,186.

*To all whom it may concern:*

Be it known that I, WILLIAM HANSON BOORNE, a citizen of the United Kingdom of Great Britain and Ireland, and resident of Bush Lane House, Cannon Street, London, E. C. 4, England, have invented certain new and useful Improvements in Electrodes for Electric-Arc Welding and Metal-Cutting Purposes, of which the following is a specification, such as will enable others skilled in the art to which it appertains to make and use the same.

This invention relates to electrodes for electric arc welding and the like purposes such as electrically cutting metal of the kind in which a metal rod or core is coated with a substantially non-conducting covering.

An object of my invention is to provide a coating having good non-conducting properties and which forms a flux producing little slag and of a kind which is easily removed after the welding or cutting process is completed. The size of the wire or rod may vary as may also the relative proportions of the constituents of the flux which latter may be of varying thickness on the wire or rod according to the diameter of the latter and the purpose for which the electrode is to be employed.

According to the present invention I coat the wire or rod with calcium hydrate and water, and then wind it with a carbonaceous fibre, such as cotton or ramie, after which I apply a coating of calcined magnesite, ferrous silicate and fibrous asbestos in any suitable relative proportions, say by weight 3 to 4 parts of magnesite, one quarter part of ferrous silicate and 6 to 10 parts of asbestos and I may add one and a half parts of graphite, with one half part of granulated aluminium or magnesium.

The asbestos must be one which contains silica and ferrous protoxide, preferably in the proportions of 5 parts of the former to each 3 parts of the latter. In preparing this coating the whole is intimately mixed and ground to a fine powder and mixed with sufficient silicate of soda (say 40° Twaddell) to make a creamy paste.

For certain steels and metals it may be advantageous to alter the proportions stated and to add 3 to 4 parts by weight of carbonate of calcium.

What I claim is:—

1. An electrode for arc welding and like purposes comprising a metal core on which is placed a coating of calcium hydrate and water, a carbonaceous fibre winding to which is applied asbestos which contains a high percentage of silica and ferrous protoxide; calcined magnesite with ferrous silicate and graphite, all intimately incorporated and ground to a powder, and mixed with a solution of silicate of soda.

2. An electrode for arc welding and like purposes comprising a metal core on which is placed a coating of calcium hydrate and water, a carbonaceous fibre winding to which is applied asbestos which contains a high percentage of silica and ferrous protoxide; calcined magnesite with ferrous silicate and graphite, all intimately incorporated and ground to a powder, and mixed with a solution of silicate of soda and with a small proportion of carbonate of calcium.

3. An electrode for arc welding and like purposes comprising a metal core on which is placed a coating of calcium hydrate and water, a carbonaceous fibre winding to which is applied asbestos which contains a high percentage of silica and ferrous protoxide; calcined magnesite with ferrous silicate and graphite, all ground and intimately incorporated and mixed with a solution of silicate of soda.

In witness whereof I have hereunto set my hand in presence of two witnesses.

WILLIAM HANSON BOORNE.

Witnesses:
HENRY FAIRBROTHER,
H. J. CHAPPELL.